United States Patent [19]
Schrattenecker

[11] Patent Number: 6,120,373
[45] Date of Patent: Sep. 19, 2000

[54] CHOPPER FOR BREAKING UP STALKS, CHIEFLY STRAW

[76] Inventor: Franz Schrattenecker, Edenaichet 21, A-4773 Eggerding, Austria

[21] Appl. No.: 09/187,578

[22] Filed: Nov. 5, 1998

[30] Foreign Application Priority Data

Nov. 7, 1997 [DE] Germany .......................... 197 49 338

[51] Int. Cl.[7] ..................................................... A01F 12/40
[52] U.S. Cl. ............................ 460/112; 460/7.1; 241/243
[58] Field of Search ............................... 241/243; 83/932, 83/300, 301, 303, 321, 328, 332, 349, 594, 847, 856, 858; 460/112, 71; 56/16.4 A

[56] References Cited

U.S. PATENT DOCUMENTS

| | | | |
|---|---|---|---|
| 9,114 | 7/1852 | Gilbert | 460/71 |
| 2,842,175 | 7/1958 | Thompson | 241/243 |
| 2,892,478 | 6/1959 | Gronberg | 241/190 |
| 2,954,812 | 10/1960 | Gronberg | 241/243 |
| 2,956,602 | 10/1960 | Gronberg | 241/243 |
| 3,350,017 | 10/1967 | Howell et al. | 241/243 |
| 3,380,502 | 4/1968 | Gronberg | 241/243 |
| 3,392,769 | 7/1968 | Gronberg | 241/243 |
| 3,762,256 | 10/1973 | Frantz | 241/243 |
| 3,874,604 | 4/1975 | Gronberg et al. | 241/243 |
| 4,077,573 | 3/1978 | Kersey et al. | 241/243 |
| 4,422,358 | 12/1983 | Hull et al. | 241/243 |
| 4,484,587 | 11/1984 | Raineri | 460/112 |
| 4,532,941 | 8/1985 | Gauthier . | |
| 4,612,941 | 9/1986 | Kunde | 460/112 |
| 4,801,101 | 1/1989 | Dreyer et al. | 241/243 |
| 5,042,973 | 8/1991 | Hammarstrand | 460/112 |
| 5,503,339 | 4/1996 | Doppstadt | 241/243 |
| 5,556,042 | 9/1996 | Roberg | 241/101.76 |
| 5,628,467 | 5/1997 | Graveman | 241/243 |
| 5,890,353 | 1/1997 | Brown | 460/112 |

FOREIGN PATENT DOCUMENTS

| | | | |
|---|---|---|---|
| 0479329 | 4/1992 | European Pat. Off. . | |
| 862383 | 7/1949 | Germany . | |
| 1193721 | 5/1965 | Germany . | |
| 1582577 | 7/1970 | Germany . | |
| 3013359 | 10/1981 | Germany . | |
| 3824888 | 5/1989 | Germany | 241/243 |
| 1953028 | 8/1995 | Germany | 241/243 |
| 19535175 | 3/1996 | Germany . | |
| 19530028 | 2/1997 | Germany . | |
| 26377 | 7/1971 | Japan | 241/243 |
| 159080 | 6/1957 | Sweden | 241/243 |
| 431179 | 2/1967 | Switzerland . | |
| 682177 | 8/1979 | U.S.S.R. | 241/243 |
| 695705 | 11/1979 | U.S.S.R. | 241/243 |
| 1353894 | 5/1974 | United Kingdom | 241/243 |

*Primary Examiner*—Thomas B. Will
*Assistant Examiner*—Arpad Fabian Kovacs
*Attorney, Agent, or Firm*—Dilworth & Barrese

[57] ABSTRACT

The invention is directed to a chopper for breaking up stalks such as straw, being provided with a chopper housing in which a rotor equipped with cutting tools and a driver are housed, and which a knife beam with counter blades is positioned. The cutting tools are equipped with slits for entrance of counter blades and are positioned to swivel on axles parallel to the rotor axle, with front edges of the cutting tools operating together with front edges of stationary countercutters.

21 Claims, 7 Drawing Sheets

CHOPPER FOR BREAKING UP STALKS, CHIEFLY STRAW

BACKGROUND OF THE INVENTION

The invention concerns a chopper for breaking up stalks, chiefly straw, with a chopper housing in which a rotor equipped with cutting tools and a drive is housed and a knife beam with counterblades is held.

Such a chopper is known from, for example, DE 195 30 028 A1.

SUMMARY OF THE INVENTION

The task of the invention is to create a chopper of the type initially described, which can be used easily and quickly on various types of stalks or for various types of cuts, and which leads to improved breaking up of the stalks.

According to the invention, this task is performed by a chopper of the type initially described in that the cutting tools are equipped with slits to permit the entrance of the counterblades and are positioned on the rotor in such manner as to swivel on axes parallel to the rotor axis (see point B in FIG. 1), and in that the end edges of the cutting tools work together with the end edges of the stationary countercutters.

Good cutting is achieved by the fact that the counterblades penetrate the cutting tools in their appropriate slits.

The cutting effect is further enhanced by the fact that the end edges of the rotor cutting tools work together with the end edges of the stationary counterblades.

To achieve simple attachment of the cutting tools, these cutting tools are appropriately mounted on retaining plates. The countercutters can be positioned next to one another in parallel rows parallel to jacket lines of the rotor, or they can be offset against one another all over the rotor jacket.

In another embodiment of the invention, the cutting tools of the rotor are held in their cutting position by shear bolts. These shear bolts protect the cutting tools from damage by foreign bodies.

The counterblades can be held on the stationary knife-beam for adjustment at shear-cut or they can swivel on pull-in cut and can be fixed in their adjusted swivel positions.

In a preferred embodiment, the counterblades can be attached to the cutting beam in such manner that they can be lowered and adjusted.

In a preferred embodiment, the rotor cutting tools are designed in the shape of a plate and are equipped with slots to permit the entry of the counterblades.

The rotor-cutting-knife end surfaces parallel to the rotor axle can work together with the end surfaces of the counterblades attached to the stationary cutting-beam.

Appropriately the end surfaces of the rotor knives and the counterblades are designed to complement one another.

The end surfaces of the rotor knives and the counterblades can be smooth or toothed.

BRIEF DESCRIPTION OF THE DRAWINGS

The end surfaces of the rotor knives and the counterblades are described below in greater detail by means of the drawing, which shows, in FIG. 1 a section through a detail of a rotor with a rotor cutting tool that makes a shear cut with a stationary counterblade, FIG. 2 a representation corresponding to FIG. 1, in which the counterblade is positioned for a pull-in cut, FIG. 3 a representation corresponding to FIGS. 1 and 2, in which the counterblade can be moved back and forth in the direction of double arrow A, FIG. 4 a plan view of the rotor cutting tools and the stationary countercutters working together, FIG. 5 a perspective view of the stationary knife-beam with counterblades and two rows of countercutters, FIG. 6 a representation corresponding to FIG. 5, in which the countercutters of the knife-beam are separated from one another by intervals, FIGS. 7–13c cutting tools in various shapes and countercutters working with them.

DESCRIPTION OF THE PREFERRED EMBODIMENTS

Figure 2:
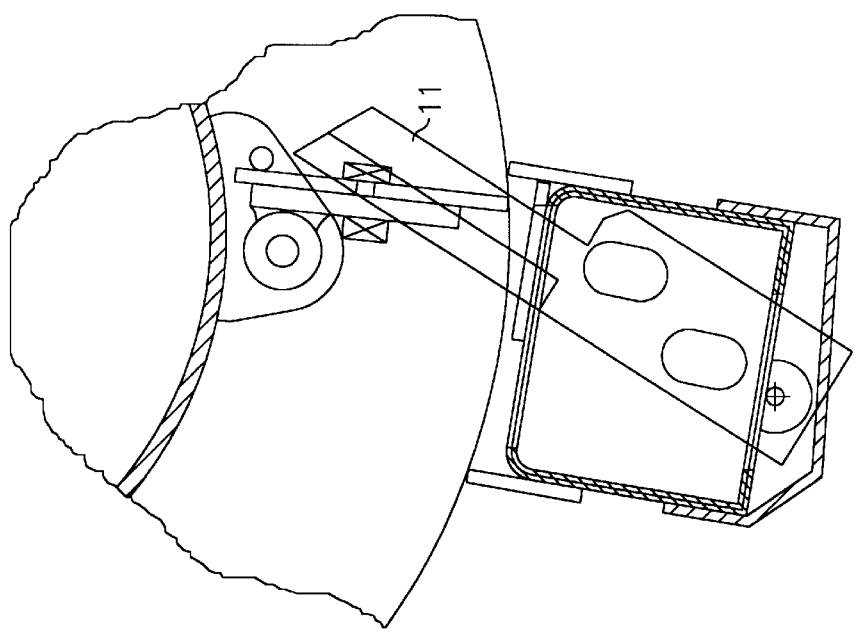
Figure 1:
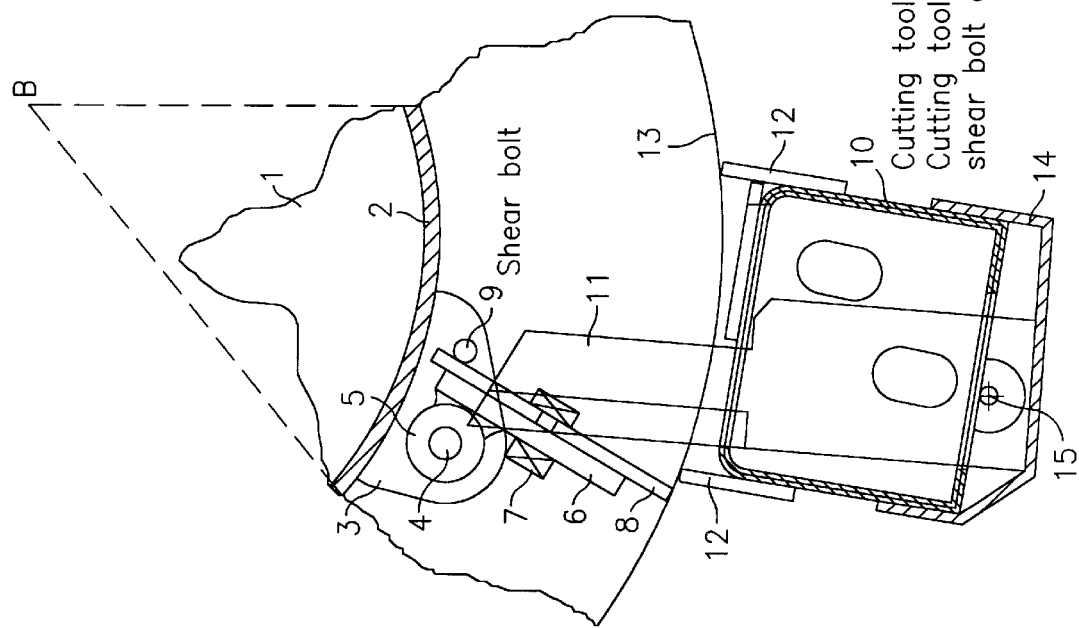

As can be seen in FIGS. 1 and 2, plates forming radial bearing blocks are welded to the housing on gasket 2 of the rotor 1 positioned in the customary manner in the chopper housing, between which bushings 5 are positioned to swivel on shafts or axes 4, with which retaining plates 6 are welded, on which the plate-shaped rotor cutting tools 8 are fastened by means of, for example, screw connections 7. Between the bearing blocks 3 there is also a shear bolt 9, against which the rear section of rotor cutting tool 8, which forms a shorter lever arm and points to jacket 2, rests in the cutting position shown.

The rotor cutting tools are equipped with slits 14 lying in the diameter planes, through which the counterblades 11 fastened to the knife beam 10 penetrate.

Countercutters 12 are bolted to the front and rear sides of knife beam 10, the front edges of which work together with the rotor cutting tools. The front edges of the rotor cutting tools and the stationary countercutters 12 work together in the area of the envelope cylinder 13 overlaid by the front edges of the rotor cutting tools.

In the position shown in FIG. 1, the counterblade 11 is positioned at shear-cut, whereas in FIG. 2 it is in a position in which a pull-in cut is made.

The counterblades 3 are positioned in a U-shaped cap 14' that can be bolted to the knife beam 10 to swivel on an axle 15 parallel to the rotor axle B (FIG. 1), so that the counterblade can be adjusted at shear-cut and pull-in-cut by appropriate swiveling and can be fixed.

Figure 3:
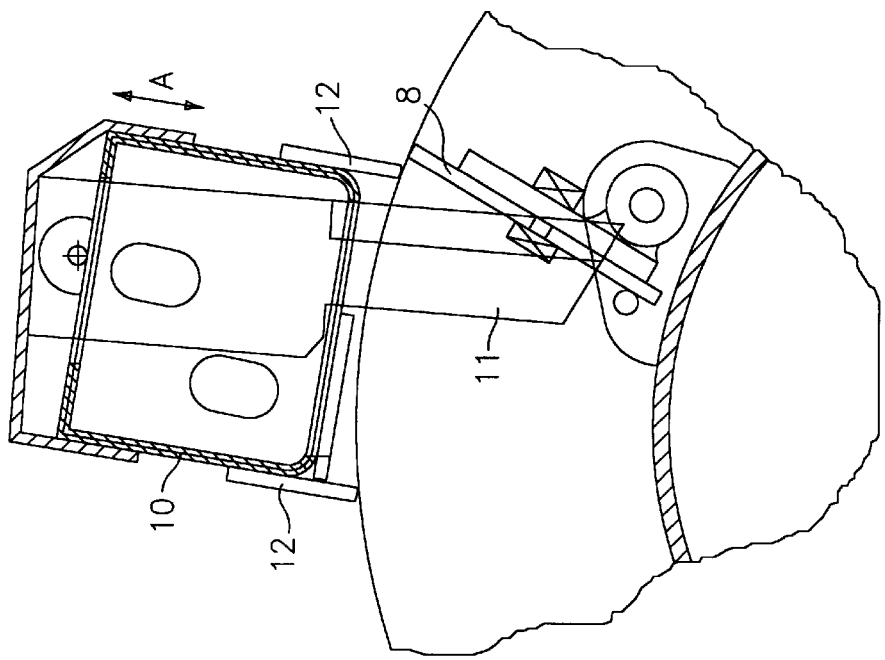
Figure 4:
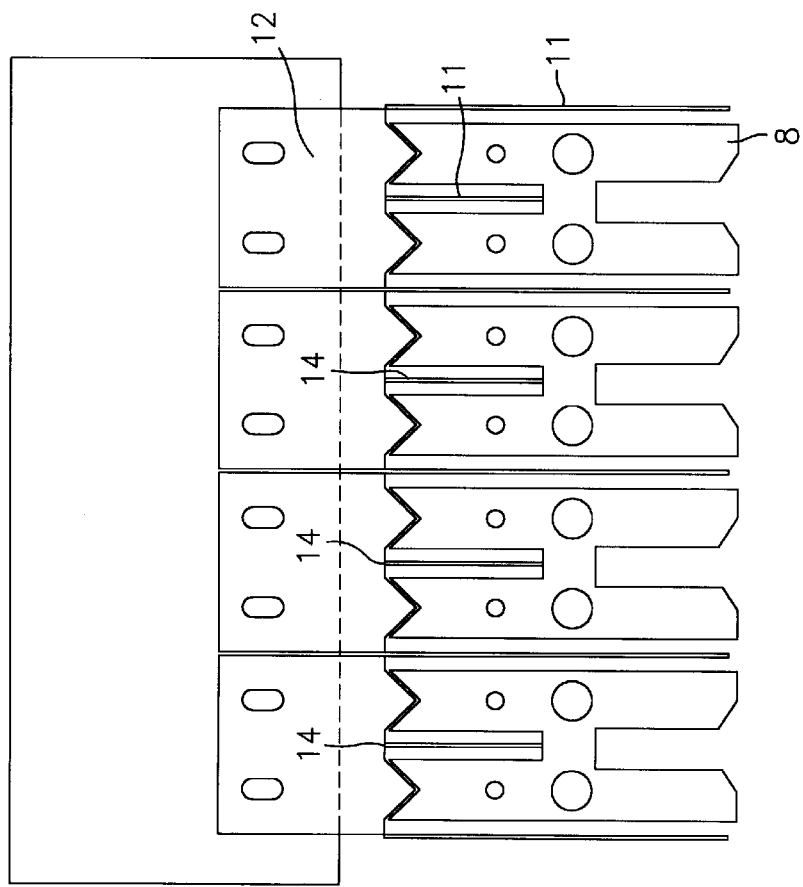

As visible in FIG. 3, the counterblade 11 can also be shifted in the direction of double arrow A on the cutting beam 10, so that the counterblade 11 can be adjusted at varying intervals relative to the rotor cutting tools 8.

Figure 5:
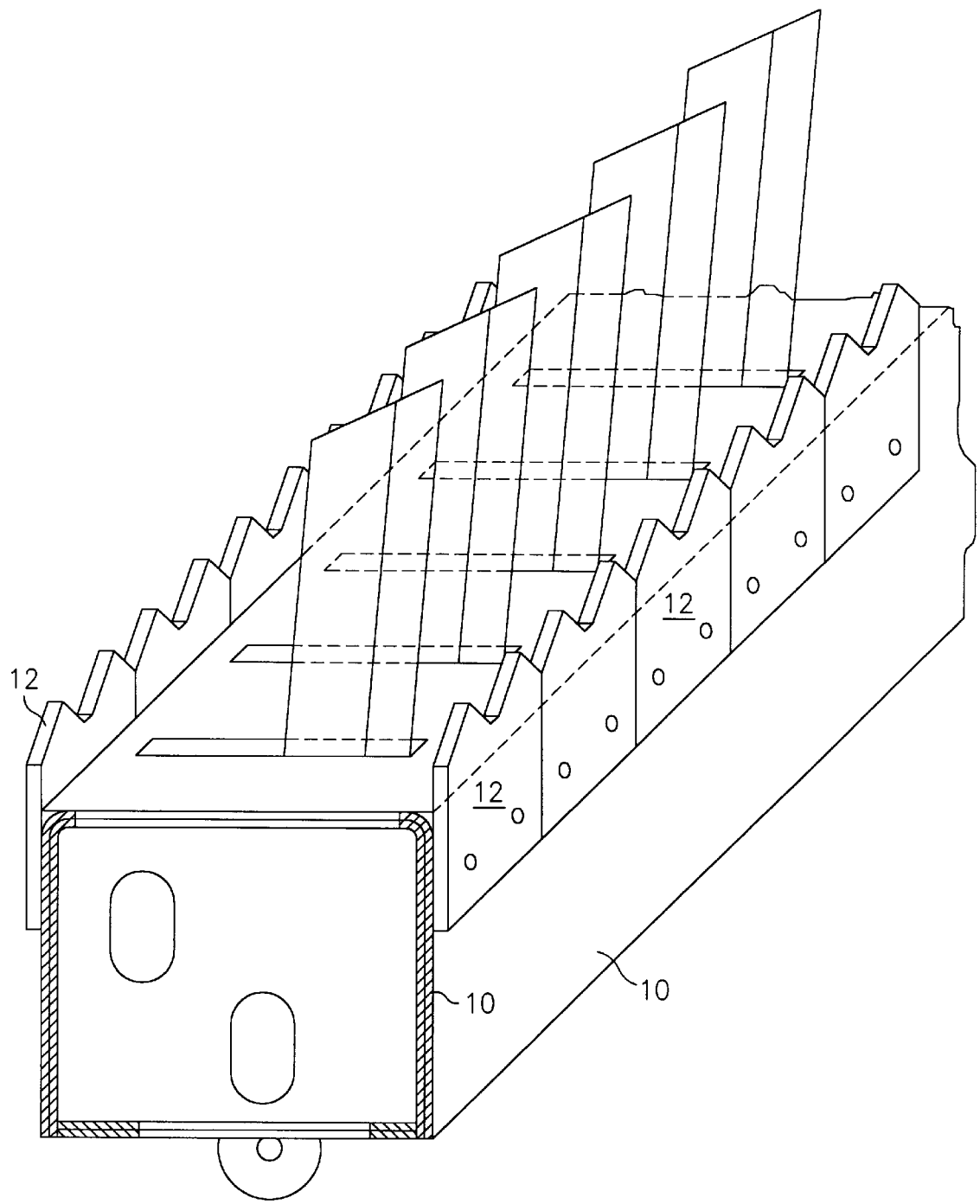
Figure 6:
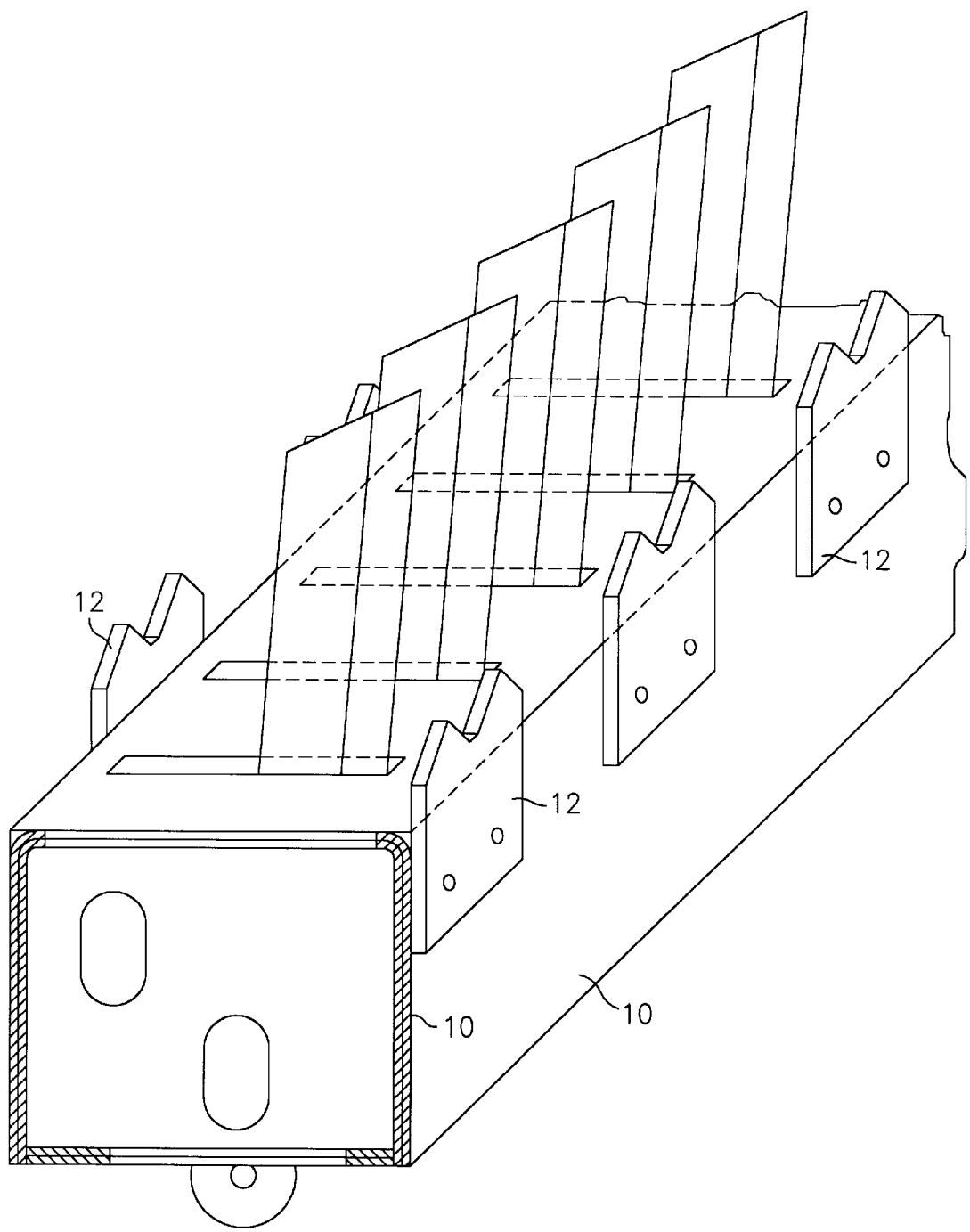
Figure 7:
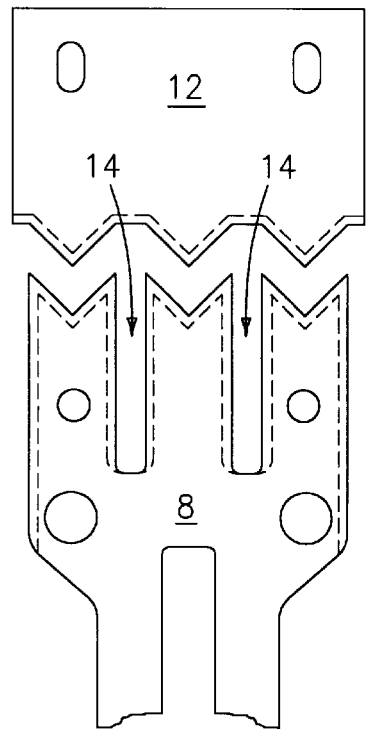
Figure 8:
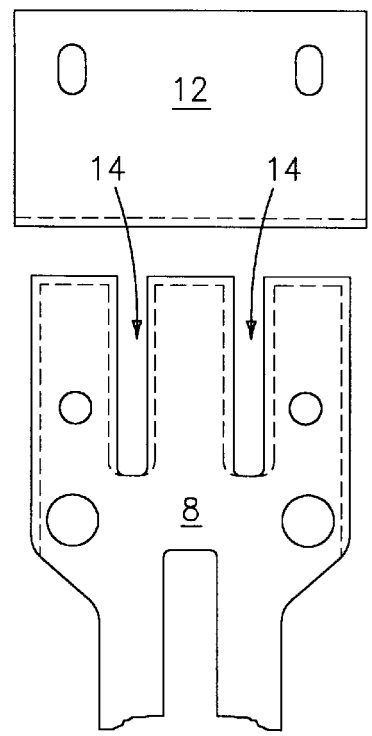
Figure 9:
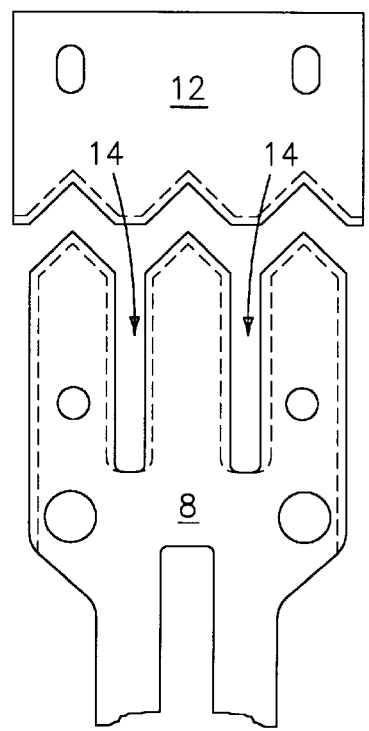
Figure 10:
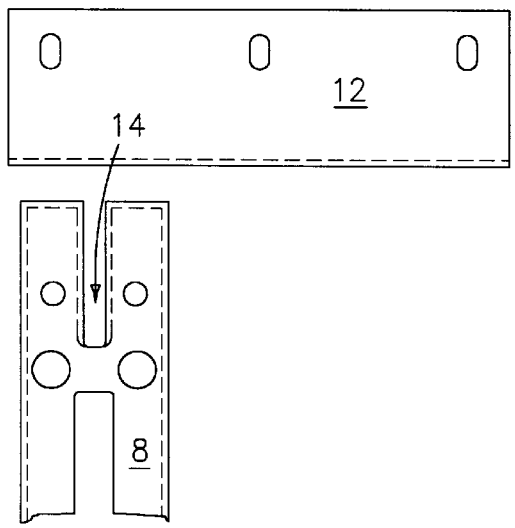
Figure 11:
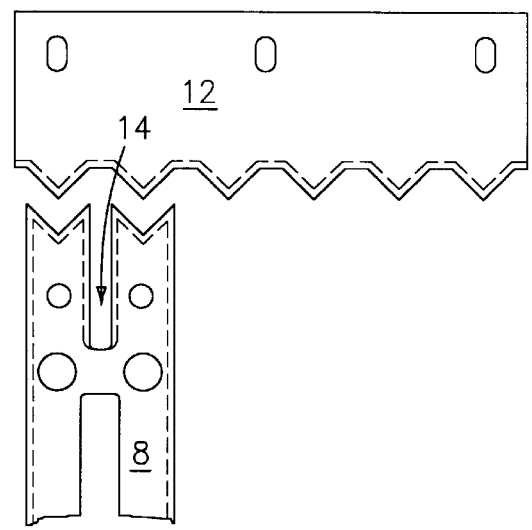
Figure 12:
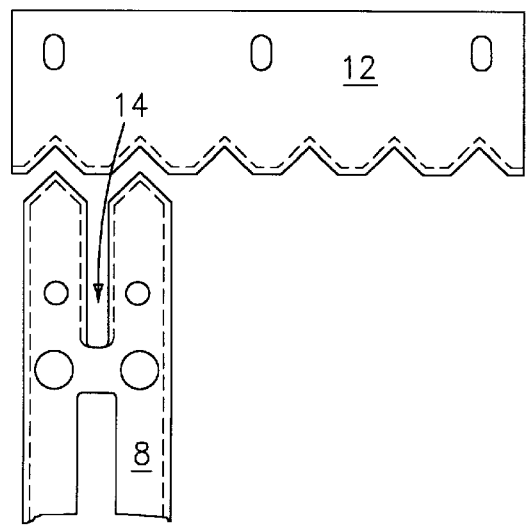
Figure 13A:
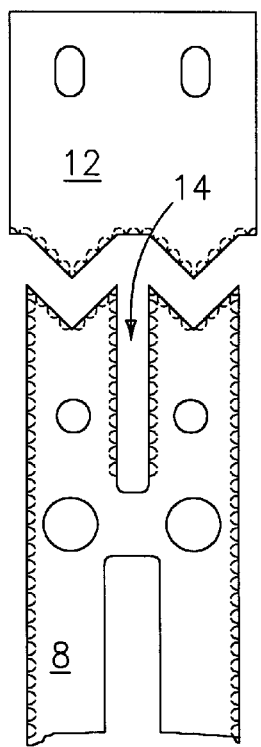
Figure 13B:
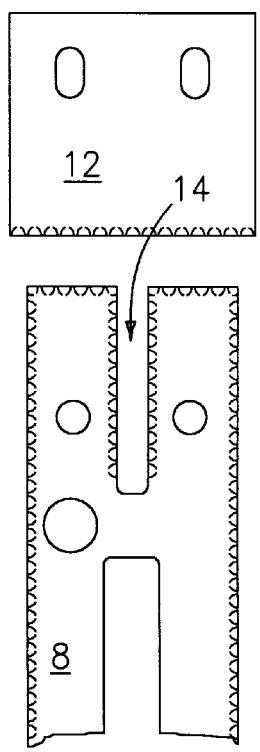
Figure 13C:
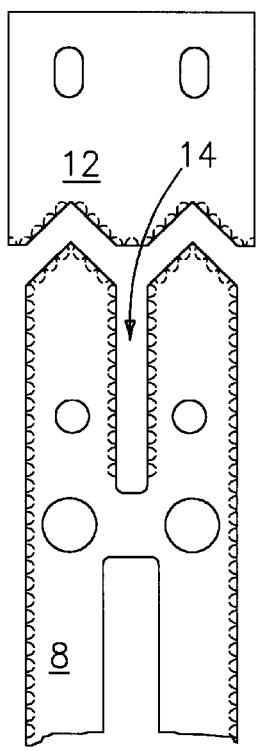

The nature of the attachment of countercutters 12 to knife beam 10 is visible in FIGS. 5 and 6.

The various shapes of rotor cutting tools 8 and countercutters 4 are visible in FIGS. 7 to 13a.

The cutting tool width is appropriately more than 10 mm., so that the straw can be grasped easily and can move the chopped material quickly after cutting.

One or more slits in the rotor cutting tools guarantee a narrow clearance with the counterblades, without requiring the giving up of maximum contact surface of the rotor cutting tools.

The counterblades and countercutters can be mounted on the knife beam in one row or in several rows or can be offset. They can be smooth or toothed.

The countercutters and counterblades can be positioned continuously along the rotor axle or can also be swung completely out of the way.

I claim:

1. Chopper for breaking up stalks, chiefly straw with a chopper housing in which a rotor comprising cutting tools and means for driving the rotor are housed and a knife beam with counterblades is positioned, characterized by the fact that the cutting tools each comprise slits arranged for entrance thereinto of the counterblades and are each positioned to swivel on axles parallel to an axis of the rotor and that stationary countercutters are additionally mounted upon the knife beam and are positioned with respect to the cutting tools such that front edges of the cutting tools, which define an envelope cylinder about the rotor, and front edges of the stationary countercutters pass in close proximity to one another upon rotation of the cutting tools to chop stalks therebetween.

2. Chopper according to claim 1, characterized by the fact that the cutting tools are each additionally mounted on retaining plates that are moveably positioned on the axles so that they can also swivel on the rotor with respect thereto.

3. Chopper according to claim 1, characterized by the fact that the countercutters are positioned in parallel rows next to one another parallel to jacket lines of the rotor.

4. Chopper according to claim 1, characterized by the fact that the countercutters are offset in relation to one another parallel to jacket lines of the rotor.

5. Chopper according to claim 1, characterized by the fact that the cutting tools are held in their cutting position by shear bolts.

6. Chopper according to claim 1, characterized by the fact that the counterblades are each movably positioned to swivel on the knife beam for adjustment to constitute means for effecting shear cut or pull-in cut, and can be fixed in various swivel positions.

7. Chopper according to of claim 1, characterized by the fact that the counterblades are attached to the knife beam in such manner that they can be lowered and adjusted.

8. Chopper according to claim 1, characterized by the fact that the cutting tools are plate-shaped and are equipped with at least one slit each for penetration by the counterblades.

9. Chopper according to claim 1, characterized by the fact that the front surfaces of the cutting tools are parallel to the rotor axis with the front surfaces of the stationary countercutters positioned on the knife beam also being parallel to the rotor axis.

10. Chopper according to claim 1, characterized by the fact that the front surfaces of the cutting tools and the countercutters are complementary-shaped with respect to one another.

11. Chopper according to claim 6, characterized by the fact that the front surfaces of the rotor cutting tools and the counterblades are smooth.

12. Chopper according to claim 2, characterized by the fact that the countercutters are positioned in parallel rows next to one another parallel to jacket lines of the rotor.

13. Chopper according to claim 3, characterized by the fact that the countercutters are offset in relation to one another parallel to jacket lines of the rotor.

14. Chopper according to claim 4, characterized by the fact that the cutting tools are held in their cutting position by shear bolts.

15. Chopper according to claim 5, characterized by the fact that the counter-blades are positioned to swivel on the knife beam for adjustment to constitute means for providing a shear cut or pull-in cut, and can be fixed in various swivel positions.

16. Chopper according to claim 6, characterized by the fact that the counter-blades are attached to the knife beam in such manner that they can be lowered and adjusted.

17. Chopper according to claim 7, characterized by the fact that the cutting tools are plate-shaped and are equipped with at least one slit each for penetration by the counterblades.

18. Chopper according to claim 8, characterized by the fact that the front surfaces of the cutting tools are parallel to the rotor axis with the front surfaces of the stationary countercutters positioned on the stationary knife beam also being parallel to the rotor axis.

19. Chopper according to claim 9, characterized by the fact that the front surfaces of the cutting tools and the countercutters are complementary-shaped with respect to one another.

20. Chopper according to claim 10, characterized by the fact that the front surfaces of the cutting tools and the counterblades are smooth or toothed.

21. Chopper according to claim 6, characterized by the fact that the front surfaces of the rotor cutting tools and the counterblades is toothed.

* * * * *